A. FLIS.
VEGETABLE STEM REMOVER AND CRUSHER.
APPLICATION FILED MAR. 20, 1922.
1,423,790.
Patented July 25, 1922.
2 SHEETS—SHEET 1.
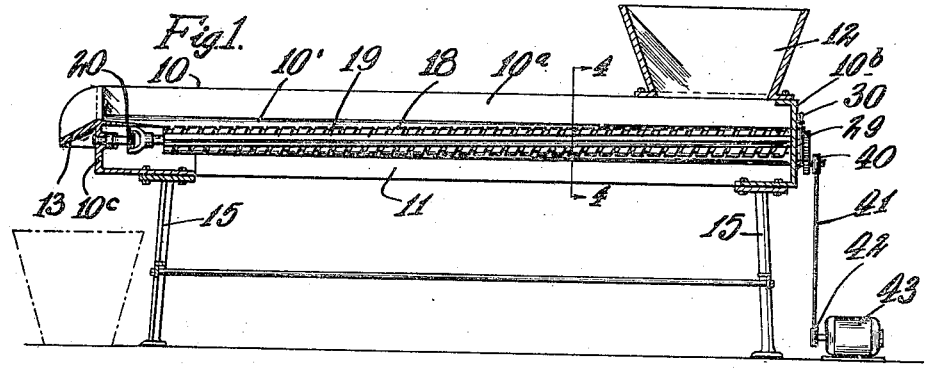
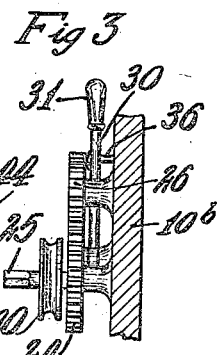
Fig.2.
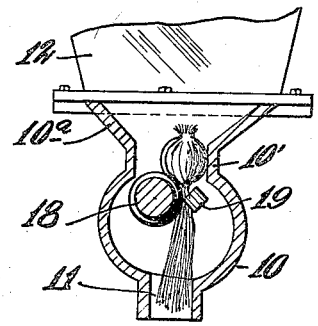
Fig.3
Fig.4.
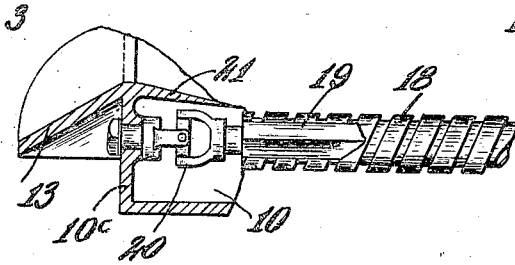
Fig.5.
Inventor
Alexander Flis
By Joltan P. Polachek
Attorney

A. FLIS.
VEGETABLE STEM REMOVER AND CRUSHER.
APPLICATION FILED MAR. 20, 1922.

1,423,790.

Patented July 25, 1922.
2 SHEETS—SHEET 2.

Inventor
Alexander Flis

UNITED STATES PATENT OFFICE.

ALEXANDER FLIS, OF MILWAUKEE, WISCONSIN.

VEGETABLE-STEM REMOVER AND CRUSHER.

1,423,790.  Specification of Letters Patent.  Patented July 25, 1922.

Application filed March 20, 1922. Serial No. 544,985.

*To all whom it may concern:*

Be it known that I, ALEXANDER FLIS, citizen of the United States, residing at Milwaukee, in the county of Milwaukee and State of Wisconsin, have invented certain new and useful Improvements in Vegetable-Stem Removers and Crushers, of which the following is a specification.

This invention relates to a machine for removing the stalks, and crushing the heads, of vegetables and it has for a general object to provide a simple and efficient machine for that purpose.

More specifically the invention may be said to have for an object to provide a pair of co-operating elements capable of relative adjustment, and adapted when in one position to remove the stalks, and when in another position to crush the heads.

For further comprehension of the invention, and of the objects and advantages thereof, reference will be had to the following description and accompanying drawings, and to the appended claims in which the various novel features of the invention are more particularly set forth.

Fig. 1 of the drawings is a longitudinal vertical sectional view of a machine constructed according to the invention, this view being taken along the line 1—1 of Fig. 6.

Fig. 2 is a fragmentary end view showing particularly the driving mechanism.

Fig. 3 is a transverse section on the line 3—3 of Fig. 2.

Fig. 4 is an enlarged detail transverse section on the line 4—4 of Fig. 1.

Fig. 5 is a fragmentary longitudinal sectional view taken on the same line as Fig. 1, but on a larger scale.

Figure 6:
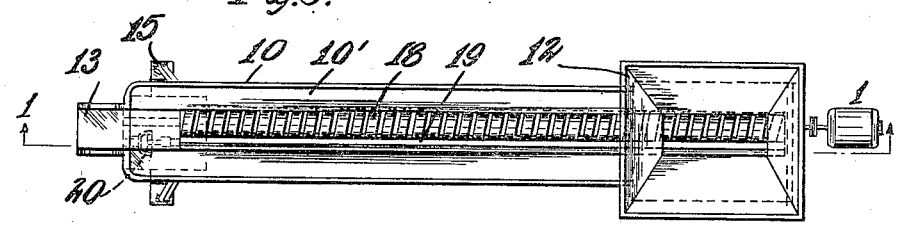
Fig. 6 is a plan view of the machine.
Figure 7:
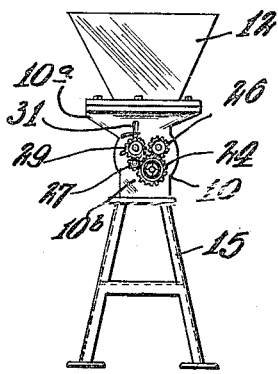
Fig. 7 is an end view of the machine.

As here embodied my improved machine comprises a trough having a pair of rotary operating elements extending longitudinally therein. This trough is indicated generally at 10 and has the sides thereof concaved as shown in Fig. 4 to accommodate the rotary operating elements, leaving a relatively narrow upper portion 10', the trough having a delivery slot 11 in the bottom, the sides of the trough being flared outwardly at the extreme top as shown at 10ª. A hopper 12 is supported on one end of this trough to receive the vegetables, while the opposite end has a delivery chute 13 leading therefrom. This trough may be supported by legs 15 suitably fixed thereto.

One of the rotary operating elements above referred to comprises a square threaded screw 18 which is suitably journaled at opposite ends in the end walls 10ᵇ, 10ᶜ of the trough 10. The end wall 10ᶜ at the delivery end of the trough terminates short of the top of the trough, the bottom of the chute 13 connecting to the top of this wall. The square cutter bar 19 which is arranged for adjustment toward and away from the screw, being preferably arranged to swing horizontally on a pivot point located adjacent the delivery end of the trough. To this end the cutter bar 19 is provided adjacent the delivery end of the trough with a universal joint 20 of the type used in jointed shafts whose sections are at an angle to one another, this end of the cutter bar being suitably journaled in the end wall 10ᶜ of the trough. A lip 21 extends from the top of the end wall 10ᶜ of the trough rearwardly over this joint, the edge of this lip being closely adjacent the screw 18 so as to readily pick up the vegetable heads fed forwardly by the screw.

To drive the screw 18 and cutter bar 19 a gear 24 is mounted on a stud shaft 25 suitably journaled in the end wall 10ᵇ of the trough at the feed end thereof. This gear 24 meshes with a gear 26 fixed to the trunnioned end 18' of screw 18 to drive the latter. For driving the cutter bar 19 gear 24 meshes with an idler 27 loose on a fixed stub shaft 28 on the end wall 10ᵇ. This idler 27 meshes in turn with a gear 29 fixed to the trunnioned end 19' of the cutter bar 19.

This end of cutter bar 19 is journaled in a lever 30 fulcrumed at its lower end on the stub shaft 28 and having a fixed handle 31 on its upper end for operating purposes, the end of the cutter bar passing through an arcuate slot 32 formed in the wall 10ᵇ concentric to stub shaft 28. The lever 30 is adapted to be swung on its fulcrum 28 to adjust the cutter bar 19 toward or away from the screw 18 and to lock it in adjusted positions an arcuate arm 34 is projected from one side thereof and is longitudinally slotted as at 35 concentric to the fulcrum 28. A bolt 36 projects fixedly from the wall 10ᵇ through this slot and has a nut 37 threaded thereon and adapted to be screwed down on the arm 34 to clamp the latter against the wall 10$^b$.

For driving the shaft 25, the latter may have mounted thereon a pulley 40 connected by a belt 41 to a pulley 42 on the rotor of an electric motor 43. The shaft 25 may have a squared end adapted to receive a crank handle such as 44 whereby it may be rotated by hand.

It is believed that the manner of use and operation of my improved machine will be readily understood from the above description. The vegetables are placed in the hopper 12 and fall on the screw 18, as indicated in dotted lines in Fig. 4. The screw 18 and cutter bar 19 rotate in opposite directions, as will be apparent, the cutter bar engaging the side of the screw as in Fig. 4 when the machine is being used to sever the stalks from the heads. The rotary motion of the screw 18 and bar 19 acts to pull the stalks therebetween, the stalks being severed from the heads by the corners of the cutter bar. The heads are moved by the screw along to the delivery end of the machine and pass out by chute 13.

When used in crushing vegetables, the cutter is swung away from the screw, nut 37 being loosened and lever 30 moved, and nut 37 again tightened. In this position the cutter bar 19 is separated from the screw 18 and the heads of the vegetables are drawn downward and crushed therebetween.

Having thus described my invention what I claim as new and desire to protect by Letters Patent of the United States is as follows:

1. In a machine of the class described, a screw, a cutter member extending along adjacent said screw, and means for rotating said screw and cutter member in opposite directions, said cutter member being in the form of a bar of polygonal cross section.

2. In a machine of the class described, a screw, a cutter member extending along adjacent said screw, and means for rotating said screw and cutter member in opposite directions, and means for adjusting said cutter member toward and away from said screw while maintaining its operative relation with its rotating means.

3. In a machine of the class described, a screw, a cutter bar extending along adjacent said screw, a universal joint formed in said bar adjacent one end thereof, and means connected to the opposite end of the said cutter bar for shifting it toward or away from the screw.

4. In a machine of the class described, a screw, a cutter bar extending along adjacent said screw, a universal joint formed in said bar adjacent one end thereof, and means connected to the opposite end of the said cutter bar for shifting it toward or away from the screw, said means including a lever in which the opposite end of said bar is journaled.

5. In a machine of the class described, a screw, a cutter bar extending along adjacent said screw, a universal joint formed in said bar adjacent one end thereof, a lever in which the other end of the cutter bar is journaled, and means for rotating said screw and cutter bar including meshing gears one of which is fixed on the end of the cutter bar and the other is mounted co-axial to the lever.

6. In a machine of the class described, a screw, a cutter member extending along adjacent said screw, and means for rotating said screw and cutter member in opposite directions, and a trough enclosing said screw and cutter bar.

7. In a machine of the class described, a screw, a cutter member extending along adjacent said screw, and means for rotating said screw and cutter member in opposite directions, and a trough enclosing said screw and cutter bar, said trough presenting a narrowed entrance opening at the top.

8. In a machine of the class described, a screw, a cutter member extending along adjacent said screw, and means for rotating said screw and cutter member in opposite directions, and a trough enclosing said screw and cutter bar, said trough presenting a narrowed entrance opening at the top, and a delivery slot extending along the bottom thereof.

In testimony whereof I have affixed my signature.

ALEXANDER FLIS.